United States Patent [19]
Boisvert et al.

[11] Patent Number: 5,329,312
[45] Date of Patent: Jul. 12, 1994

[54] DC LEVEL CONTROL CIRCUITRY FOR CCD IMAGES

[75] Inventors: David M. Boisvert, Rochester; Michael J. Gaboury, Spencerport; Gregory O. Moberg, Rochester, all of N.Y.

[73] Assignee: Eastman Kodak Company, Rochester, N.Y.

[21] Appl. No.: 931,245

[22] Filed: Aug. 17, 1992

[51] Int. Cl.[5] .............................................. H04N 5/18
[52] U.S. Cl. ..................................... 348/256; 348/257
[58] Field of Search ............ 358/34, 171; H04N 5/16, H04N 5/18, 9/72

[56] References Cited

U.S. PATENT DOCUMENTS

| | | | |
|---|---|---|---|
| 3,818,127 | 6/1974 | Walter | 358/171 |
| 4,549,215 | 10/1985 | Levine | 358/213 |
| 4,886,986 | 12/1989 | Watanabe | 307/353 |
| 4,980,768 | 12/1990 | Stehle et al. | 358/171 X |
| 4,987,321 | 1/1991 | Toohey | 307/520 |
| 5,010,408 | 4/1991 | Toohey | 358/213.11 |

OTHER PUBLICATIONS

M. H. White et al., entitled "Characterization of Surface Channel CCD Image Arrays at Low Light Levels," *IEEE Journal of Solid-State Circuits*, vol. SC-9, No. 1, Feb. 1974, pp. 1-13.

*Primary Examiner*—Mark R. Powell
*Attorney, Agent, or Firm*—Raymond L. Owens

[57] ABSTRACT

There are disclosed electronic imaging systems employing CCD imaging units and one or more unique analog signal processors (ASP's). Each ASP receives color-component image signals from the CCD unit and provides respective output image signals, such as red, green and blue color components, having proper white balance for combining into a full color image. The dark background or zero level of the output image signals is referenced to a common "dark" reference voltage to minimize dark background variations in the combined color image regardless of the gain setting of the ASP or ASP's. Each ASP is substantially identical and has a unique architecture which facilitates its implementation as an integrated circuit. The ASP has a dynamic range of substantially better than 8-bits and provides for a wide range of signal sample rates (e.g., 1 to 40 MHz).

13 Claims, 7 Drawing Sheets

DC LEVEL CONTROL CIRCUITRY FOR CCD IMAGES

CROSS REFERENCE TO RELATED PATENT APPLICATION

The present invention is related to a co-pending U.S. patent application Ser. No. 930,137 now Pat. No. 5,435,412, which is being filed concurrently with the present patent application and is entitled "Improved Electronic Color Imaging System and Analog Signal Processor Therefor", and has a common assignee with the present patent application, and has as its inventors, David M. Boisvert and Charles V. Stancampiano.

1. Field of the Invention

This invention relates to a high performance, cost effective electronic analog signal processor for imaging systems utilizing charge coupled devices (CCD's) or the like to provide high quality electronic images for use in high definition color television (HDTV) systems, or as needed in relatively slow speed photographic-quality still imaging systems.

2. Background of the Invention

Recent years have seen the rapid development of photo-sensing charge coupled devices (CCD's) for electronic imaging of a scene. Because of their many advantages (small size, low power, low cost, etc.) CCD's have become the imaging units of choice in many applications such as consumer camcorders. And as the performance and quality of CCD's improves, they are being used more and more in various imaging systems requiring high resolution, full color balance, wide dynamic range, low-light sensitivity, and high frequency response such as required by high definition television (HDTV) or as needed in instruments used for astronomical observations where incident light levels are extremely low.

A CCD photo-imaging unit typically has horizontal rows and vertical columns arranged in an X and Y pattern of light-sensing cells within a given area onto which an image of a scene is optically focused. By way of example, there may be about a thousand or more such cells in each vertical column and a thousand or more cells in each horizontal row for a total of a million or more cells within an area which may be only one or a few square centimeters. Each cell represents a very small area, termed a pixel, of the total image; the more pixels present in the CCD unit, the finer the grain (or lack thereof) in the image reproduced by the CCD. For prospective HDTV applications, about two million pixels per image area of a CD are used, and the pixel signals are sampled and outputted from the unit as analog image signal voltages to a signal processor at about a 40 MHz rate. This is a much higher rate than is required, for example, in a present day color television system operating in accordance with the national television standards committee (NTSC) requirements and having only about one-quarter million pixels. This high speed of 40 MHz is difficult to achieve along with very low noise, good color balance, and linearity over a wide dynamic range.

There are certain characteristics of a CCD photo-imaging unit which must be compensated for by the electronic analog signal circuitry which receives and processes the video signals produced by the CCD unit in order to obtain a high quality image. The electrical signal stored at each cell of the CCD unit is related to the intensity of the light of an image at a given instant incident on the area of that particular cell. The individual cells are made very small (e.g., about 5 microns square) in order to obtain a large number of pixels per area (e.g., two million per area). As a consequence, each cell has high impedance and the electrical signal from each cell (representing an image pixel) is relatively small. Therefore noise, such as thermal noise and switching transients within the CCD unit, becomes a significant factor affecting the quality of an image reproduced by the unit.

An extensive discussion of CCD imaging units and some of the problems associated with them is given in an article by M. H. White, et al., entitled "Characterization of Surface Channel CCD Image Arrays at Low Light Levels", *IEEE Journal of Solid State Circuits*, vol. SC-9, No. 1, February 1974, pages 1–14. This article describes the theory and operation of a CCD imaging unit and describes a method termed correlated double sampling (CDS) "to remove switching transients, eliminate the Nyquist noise associated with the reset switch/node capacitance combination, and suppress '1/f' surface-state noise contributions of a CCD unit". A schematic diagram of a CDS signal processor employing the method of correlated double sampling is shown in FIG. 5, page 4.

U.S. Pat. No. 5,010,408 (Toohey), which has an assignee in common with the present patent application, shows an improved CDS circuit to reduce noise and distortion in the signal from a CCD imaging unit. As the need increases for higher sampling speeds and greater fidelity and resolution in the images produced by a CCD unit, there is a corresponding need for an analog signal processor having better high speed performance and greater accuracy than the circuit shown in this Toohey patent or in the previously described White et al. article.

The individual cells of a CCD unit are adapted by means of respective color masks (filters) applied over the cells to respond to respective color components of an image. For example, certain cells are covered with red (R) masks, other cells by green (G) masks, and the remaining cells by blue (B) masks. Thus the R, G and B color components of an image are separately detected by respective ones of the R, G and B cells in a CCD unit. However, because of the differences in light transmittance of the green masks versus the red masks and the blue masks, the sensitivity of cells to green light is substantially greater than the sensitivity of the cells to red light or to blue light. The "green" cells generate (for a given "white", or balanced color image) substantially greater electrical output signals than do the "red" or the "blue" cells. It is necessary therefore to compensate for these differences in the R, G, and B signal outputs in order to obtain a proper "white balance" in an electronically reproduced image. Furthermore, when the R, G and B cells do not receive any light (total darkness), they still produce a small minimum "dark" signal voltage. The cells themselves are all the same (only the color masks are different) and the "dark" (no light) signals are substantially the same for all of the cells in a given horizontal row of a CCD unit. As will be explained in detail hereinafter, unless this "dark" signal characteristic of the R, G and B cells is properly compensated for (along with white balancing of the respective colors), there will appear in a high resolution color image, such as in a HDTV system, visually objectionable "streaks" or variations in the "dark" background of the color image. The present invention provides a highly effective answer to this problem of proper white balance and of reduction in dark background variations.

The dynamic range of an analog image signal is conveniently expressed as a binary bit number. Thus an 8-bit number (with a decimal equivalent of 256) expresses the ability of a circuit to divide (digitize) the signal accurately into 256 parts. This in turn implies that noise and distortion contribute less than one part in 256 parts (about ½ percent) of the total image signal. By way of example, consumer camcorders have a dynamic range of about 8-bits, whereas quality color film today has a dynamic range of roughly 12 to 14-bits (with a decimal equivalent of 4096 to 16,384). It is desirable therefore, in producing high quality electronic color images, such as desired for HDTV systems, to provide an analog signal processor (ASP) for the output of a CCD imaging unit having a dynamic range substantially greater than 8-bits.

It is highly desirable also from the standpoint of low cost, small size, uniform quality, etc., to be able to implement an analog signal processor (ASP) as an integrated circuit (IC). However, there are limitations which the circuit architecture of an ASP imposes on the way in which it can be implemented as an IC, and conversely there are limitations on the performance of the ASP resulting from how it is implemented as an IC. Thus, if the ASP is intended for high speed sampling (as required by HDTV), it is difficult to implement the ASP in complementary metal oxide semiconductor (CMOS) technology because of the limited high frequency response of CMOS devices. It is desirable, however, in order to economize on tooling costs of the IC, to be able to use a given ASP already implemented as an IC for high speed sampling also at low sampling rates (e.g., 1 MHz). These low rates along with dynamic ranges of better than 10-bits are desirable in such applications as photographic-quality still imaging where high sensitivity and very low noise are important. The present invention provides an architecture for such an ASP which is readily implemented as an IC in bipolar/-junction field effect transistor technology. The ASP (as an integrated circuit) is well suited for a wide range of high performance electronic imaging applications. As an IC the ASP provided by the invention is highly cost effective.

It is desirable to have an electronic analog signal processor and imaging system which are versatile in operation and which provide:
1. Operation over a wide range of signal sampling rates (e.g., 1 to 40 MHz).
2. Dynamic range of 10-bits or better at slow sample rates and better than 8-bits at 40 MHz.
3. Improved clamp, sample and signal hold operation (modified "correlated double sampling") for more efficient utilization and higher signal to noise ratio (S/N) of the output signals of a CCD imaging unit.
4. Effective "white balance" of the component colors (e.g., R, G, B) of an image along with minimal dark background variation.
5. Periodic "dark" pixel referencing (line rate clamping).
6. Extremely stable and linear operation with efficient temperature compensation.
7. Ease of implementation as an integrated circuit.
8. Very small physical size.
9. Cost effectiveness

SUMMARY OF THE INVENTION

In accordance with one aspect of the invention, there is provided a unique architecture for an analog signal processor (ASP) suitable for use in a variety of high performance electronic imaging systems. This new architecture permits the ASP to be readily implemented as a single IC in bipolar/junction field effect transistor (JFET) technology. The building blocks of this new architecture comprise four sections. The first section is a front-end circuit adapted to be connected to the output of a CCD imaging unit. The second section is a variable gain wide-bandwidth amplifier connected to the first section and providing an amplified low-noise image signal. The third section is an output multiplex inverter amplifier connected to the second section and providing a low noise, low impedance output image signal. The fourth section is a feedback servo loop with an output connected to an input of the second section and an input connected to receive an amplified image signal. The first section of the ASP is an improved circuit arrangement to clamp, sample and hold the pixel image signals from a CCD imaging unit. This circuit permits a very wide range of signal sampling rates (e.g., 1 to 40 MHz) while at the same time further reducing noise and switching transients. The second amplifier stage has electronically adjustable gain and bias settings and is designed for very low noise amplification of image signals over an extremely wide bandwidth. The third output section receives amplified image signals from the second section, changes the dark pixel portion of the signal to a "blank" reference level, and inverts the signals to provide positive-going output image signals corresponding to negative-going image signals from a CCD unit. The third stage multiplexes the noise-free "blank" reference level into the output image signals of the ASP during vertical to horizontal line transfer in a CCD unit. The fourth section serves as a feedback servo loop to reset the "dark" level of the image signals from the second (amplifier) section to a desired direct current (d.c.) "zero" level regardless of the gain setting of the second section. This effectively eliminates dark background variations in the output image signals from the ASP. By placing the feedback servo loop after the second section, when the gain of the second section is adjusted, this adjustment does not affect the d.c. "zero" level of the output image signals. As will be explained in detail hereinafter, making the "dark" background level independent of the gain setting of the second section greatly facilitates "white balancing" of the component colors (e.g., R, G and B) in an electronic color imaging system.

The first (input) section of the ASP is provided with a differential sample and hold circuit including two very small storage capacitors (e.g., 3 pF each) which are closely matched to each other. One of these capacitors is used to sample and hold the instantaneous pixel image signal being outputted by a CCD imaging unit. Being of very small capacitance and thus of high impedance even at high frequency, this capacitor does not degrade the accuracy of the image signal being sampled onto the capacitor at a 40 MHz rate. These very small storage capacitors are also easily implemented as circuit elements with the IC technology used to implement active elements (e.g., switches and transistors) of the ASP. The two capacitors are connected to respective inputs of a differential amplifier in the second section. By virtue of the differential arrangement of these two capacitors, even though the voltage respectively stored on each from one sampling period to the next may decay slightly (because of a long time interval at slow sample rates such as 1 MHz), this small change (decay) in voltage is canceled out in the following circuitry of the second section of the ASP.

In accordance with another aspect of the invention, there is provided an electronic color imaging system. This system utilizes a CCD imaging unit which produces a plurality of image signals each of which corresponds to a color component (such as R, G and B) of an overall image. Each of these color component signals from the CCD unit is applied to a respective ASP (as described previously and embodying a first aspect of the invention). The ASP's are operated in unison and in parallel with each other. The gain of each ASP is set separately to achieve "white balance" when the color components being separately processed by the respective ASP's are recombined into a full color image. "Dark" level differences are eliminated even though the color components are amplified in different amounts by their respective ASP's to achieve white balance. As was explained previously, the ASP is advantageously an IC; thus the plurality of ASP's in this color system are identical to each other and operate under identical conditions (though with separate gain and feedback settings). This greatly simplifies system design and overall cost while at the same time giving a more nearly perfect level of image reproduction.

In accordance with yet another aspect of the invention, there is provided an analog signal processor (ASP) for use with a CCD imaging unit in an electronic image system. The ASP has an input section having means for receiving input image pixel signals from the CCD unit and for clamping, sampling and holding sample values of the pixel signals for processing within the ASP. The ASP also has amplifier means for receiving sample values of the pixel signals and for amplifying the signals with a selected gain at low noise over a wide bandwidth to obtain output image signals. The amplifier means has gain which is adjustable over a range and has a feedback signal input for setting a d.c. level of the output image signals at a desired dark zero value. The ASP further has feedback means for image signals and for feeding back to the feedback signal input of the amplifier means correction signals for setting the dark zero value of the output image signals independent of the gain setting of the amplifier means.

The invention will be better understood from a consideration of the following detailed description taken in conjunction with the accompanying drawings and claims.

DETAILED DESCRIPTION

Figure 1:
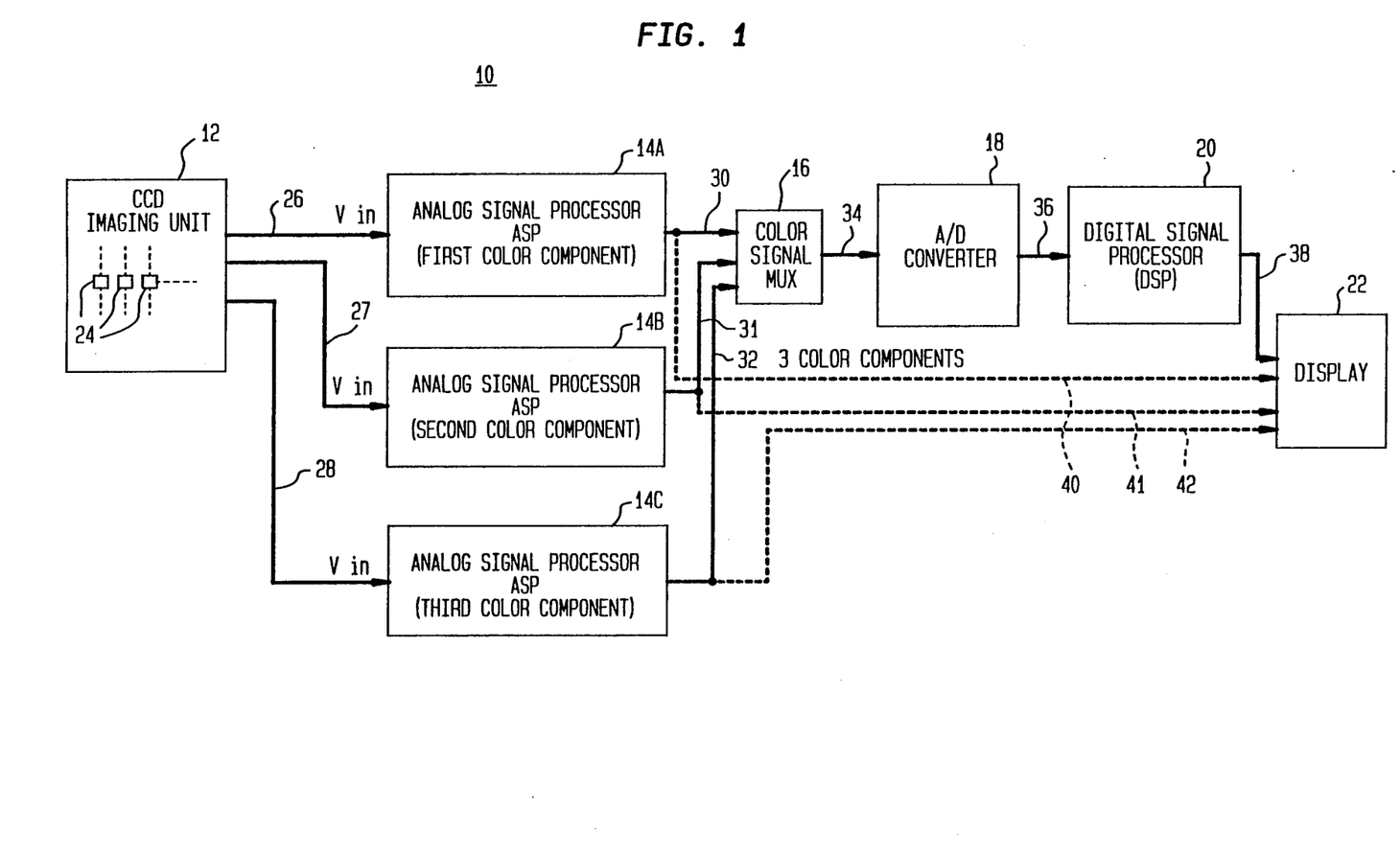
FIG. 1 is a schematic block diagram of an electronic color imaging system in accordance with the present invention.

Referring now to FIG. 1, there is shown an electronic color imaging system 10 in accordance with the present invention. The imaging system 10 comprises a CCD imaging unit 12, a plurality of identical analog signal processors (ASP's) (three being shown here as 14A, 14B, and 14C), a color signal multiplex (MUX) unit 16, an analog to digital (A/D) converter 18, a digital signal processor (DSP) 20, and an image display 22. The CCD unit 12 is of a type well known in the art. It receives an image of a scene which is optically focused onto a multitude of very small photo-sensitive cells 24 (three of which are illustrated by way of example) arranged over an area in closely spaced rows and columns X and Y. Each cell 24 forms an individual pixel of the total image. Respective cells 24 may be covered by separate color masks (e.g., R, G and B) to provide separate color-component image signals, as was explained previously. By way of example here, a first color-component of an image signal is outputted from the CCD unit 12 on a signal lead 26 as a signal "V in" to an input of the ASP 14A. Similarly, a separate second color-component is applied from the CCD unit 12 on a signal lead 27 to an input of the ASP 14B, and a separate third color-component is applied on a signal lead 28 to an input of the ASP 14C. These three color components (e.g., R, G and B) are processed separately though in unison by the ASP's 14A, 14B and 14C. As will be explained hereinafter, the signal gains (amplification factors) of the ASP's 14A, 14B and 14C are individually adjusted to obtain a desired "white balance" when the individual color-component signals are re-combined into a full color image.

The ASP 14A samples, amplifies and inverts the input image signal "V in" and applies an output signal (first color component) via a lead 30 to the color signal MUX unit 16. Similarly an output signal (second color component) from the ASP 14B is applied via a signal lead 32 to the MUX unit 16, and an output signal (third color component) from the ASP 14C is applied via a signal lead 32 to the unit 16. The three color-component signals, adjusted for white balance within their respective ASP's, are combined in proper sequence by the unit 16 and are applied via a signal lead 34 to an input of the A/D converter 18. A digitized color image signal from the A/D converter 18 is applied via a signal lead 36 to the DSP 20 and thence from an output of DSP 20 via a signal lead 38 to the display 22. The unit 16, A/D converter 18, DSP 20 and display 22 are well known in the art and their operation (as part of a HDTV system, for example) is conventional. The structure and operation of one of identical ASP's 14A, 14B and 14C will be described in detail shortly. If desired, three color-component output signals from the ASP's 14A, 14B and 14C may be directly connected to corresponding inputs (e.g., R, G and B) of the display 22 as is indicated here by the respective signal leads 40, 41 and 42 (shown as dashed lines). It is to be understood that for certain imaging applications, more or fewer color-component signals than the three illustrated in the system 10 may be used, and as will be further explained hereinafter, that the ASP's 14A, 14B and 14C are controlled in unison by certain control signals (φ) and reference voltages applied in common to all three of them. The signal gains of the respective ASP's 14A, 14B and 14C are separately adjusted as needed to provide white balance of the color components of the electronic images being produced.

Figure 2:
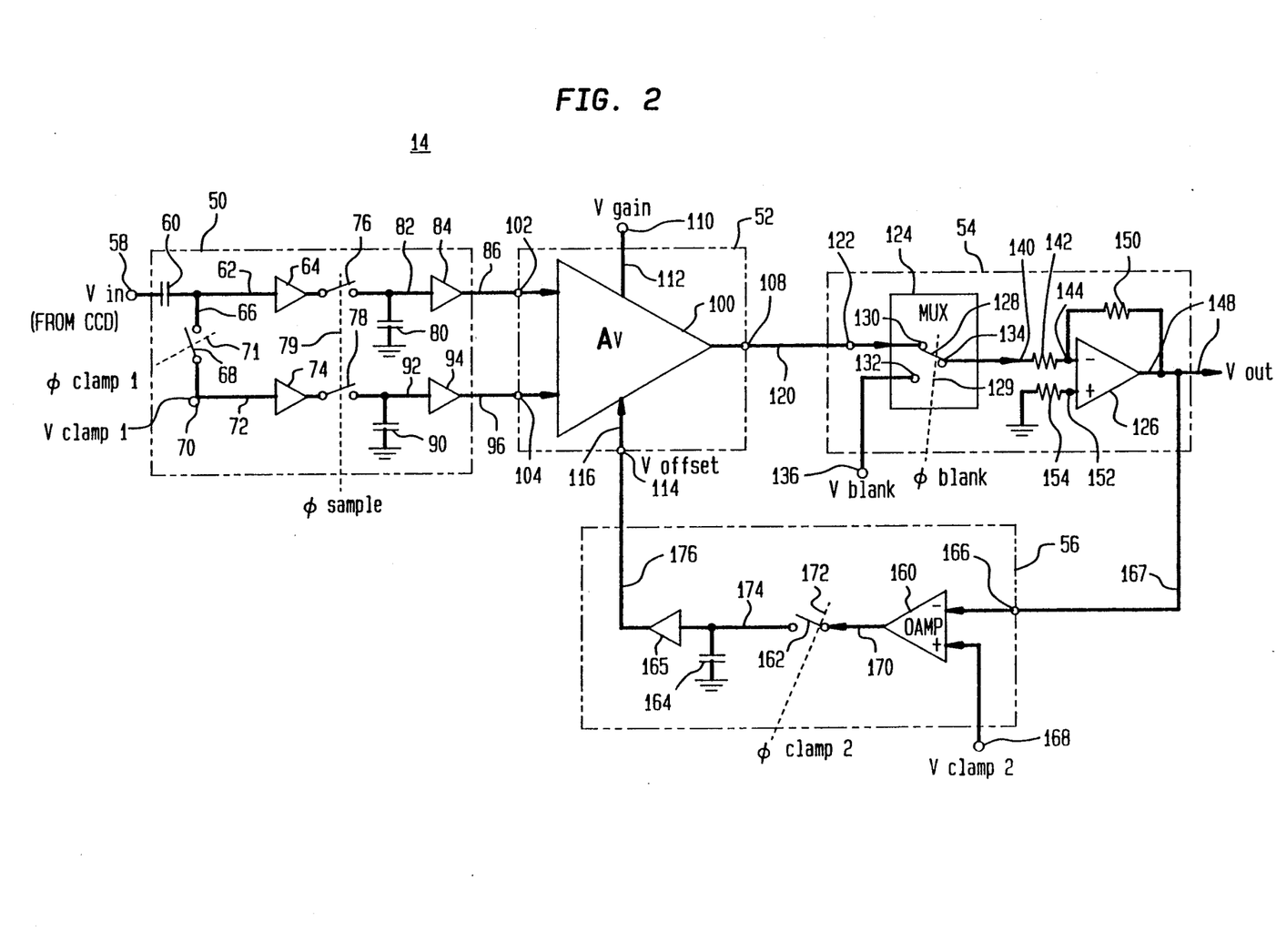
FIG. 2 is an illustrative schematic circuit diagram of an analog signal processor (ASP) of FIG. 1 and is in accordance with the present invention.

Referring now to FIG. 2, there is shown a circuit diagram of an ASP 14 which can serve as any one of the ASP's 14A, 14B and 14C of FIG. 1. The building blocks of the ASP's 14A are a first (input) section 50, a second (amplifier) section 52, a third (output) section 54 and a fourth (feedback) section 56. Each of these sections 50, 52, 54 and 56 is shown within a respective dashed line box. The first section 50 of the ASP 14 has an input terminal 58 which is adapted to receive a respective color component of output image signals "V in" from the CCD unit 12 (see FIG. 1). The input terminal 58 of the section 50 is connected to a first terminal of a coupling capacitor 60, a second terminal of which is connected via a lead 62 to an input of a buffer amplifier 64 and via a lead 66 to a first terminal of a clamping switch 68. A second terminal of the switch 68 is connected to a terminal 70 to which a reference voltage "V clamp 1" is applied and is connected via a lead 72 to an input of a buffer amplifier 74. The switch 68 is activated by a control signal "φ clamp 1" as indicated by the dashed line 71. The opening and closing of the switch 68 with relation to the input image signals "V in" is described hereinafter. The buffer amplifiers 64 and 74, which are identical, comprise part of a differential circuit which improves the low noise and wide range of operation of the ASP 14.

The output of the buffer amplifier 64 is connected to a first terminal of a switch 76 and the output of the buffer amplifier 74 is connected to a first terminal of a similar switch 78. Both switches 76 and 78 are actuated together by a control signal "φ sample" as indicated by the dashed line 79. The opening and closing of the switches 76 and 78 with relation to the input signals "V in" is described hereinafter. Connected to a second terminal of the switch 76 is a first terminal of a small storage capacitor 80 which has a second terminal which is grounded. The voltage stored on the capacitor 80 is applied via a lead 82 to an input of a buffer amplifier 84 which has an output which is applied to a lead 86. Similarly, a second terminal of the switch 78 is connected to a first terminal of a small storage capacitor 90, a second terminal of which is grounded. The voltage stored on the capacitor 90 is applied via a lead 92 to an input of the buffer amplifier 94 which has an the output which is applied to a lead 96. The capacitors 80 and 90 are advantageously very small (e.g., 3 pF each) and identical to each other. The capacitance of capacitors 80 and 90 is selected in accordance with sample rate and can vary from over a considerable range (e.g., less than 1 pF to 100's of pF's). Even at a high sample rate of 40 MHz of the image signals "V in" from the CCD unit 12 applied to the terminal 58, the capacitor 80, being very small, quickly charges to full input signal level when the switch 76 is closed. The capacitor 80 (even though very small) holds its charge substantially at that level when the switch 76 is opened and until it is closed again about 25 nanoseconds later. During this time the capacitor 90 is charged to the level of the reference voltage "V clamp 1". Both capacitors 80 and 90, having identical time constants, will over time lose their respective charges (by leakage, etc.) at substantially the same rate. In other words, the respective voltages stored across capacitor 80 and across capacitor 90 during a period of time "droop" together. Such droop in voltage is more pronounced at low sample rates (e.g., 1 MHz) but is effectively canceled out. This is achieved here by connecting the output of the buffer amplifier 84 via the lead 86 and the output of the buffer amplifier 94 via the lead 96 to respective differential inputs of the second (amplifier) section 52. This enables the ASP 14 to operate effectively over a wide range of sample rates of the input signal "V in" at terminal 58. By way of example, the coupling capacitor 60 may have a value of 2000 pF and can be external to the remainder of the circuit of section 50. The coupling capacitor 60 and the switch 68 correspond to the capacitor "C1" and the clamp switch "1" shown in FIG. 5, page 4 of the above-identified White, et al. article. The ASP 14 provided by the present invention combines "correlated double sampling" (CDS) noise reduction with differential noise and error cancellation, and a wide range of signal sample rates.

The second section 52 of the ASP 14 comprises a variable gain amplifier ("Av") 100 which has a first input terminal 102 connected to the lead 86, and has a second input terminal 104 connected to the lead 96. The amplifier 100 has an output terminal 108. The gain of the amplifier 100 is adjustable and is determined by an external voltage "V gain" applied to a terminal 110. The voltage "V gain" is applied at a suitable node (not explicitly shown) within the amplifier 100 via a lead 112. The "dark" level of the output signal of the amplifier 100 at the output terminal 108 is set by a voltage "V offset" at a terminal 114. This voltage "V offset" is applied via a lead 116 at a suitable point in the circuit (not explicitly shown here). The amplifier 100 differentially amplifies the respective signals applied to the input terminals 102 and 104, and applies a suitably amplified single-ended output signal to the output terminal 108. The amplifier 100 consists of three main functional blocks. Though not shown here, these are: a differential voltage to differential current input stage, a Gilbert gain cell, and a differential current to single-ended voltage output driver. Circuits for each of these functional blocks are well known in the art. The amplifier 100, by way of example, can be substantially identical to one described in detail in an article by R.A. Blauschild entitled "An Open Loop Programmable Amplifier with Extended Frequency Range", *IEEE Journal of Solid-State Circuits*, Vol. SC-16, No. 6, December 1981, pages 626-633, which is incorporated herein by reference. A detailed schematic diagram of a complete amplifier circuit (implemented as an IC) is given in FIG. 10, page 631 of the Blauschild article. A gain-setting control voltage (corresponding to "V gain" of the "Av" amplifier 100 of the ASP 14) can be applied at the circuit node identified as "bias 6" in FIG. 10 of Blauschild, and a "zeroing" voltage ("V offset") applied at "bias 8". It is noted that by limiting the bandwidth (and hence noise) of the amplifier 100, the dynamic range of the ASP 14 at slow sample rates (e.g., 1 to 15 MHz) is substantially better than 10-bits.

The output terminal 108 of the amplifier 100 of the second section 52 is connected via a lead 120 to an input terminal 122 of the third section 54 within which are a multiplex (MUX) unit 124 and an inverting amplifier 126, which are both well known in the art. The MUX 124 comprises a single pole double throw switch 128 which is actuated by a control signal "φ blank" as indicated by the dashed line 129. The switch 128 has a first terminal 130, a second terminal 132 and a common third terminal 134. The terminal 130 is connected to the input terminal 122, and the terminal 132 is connected to a second input terminal 136 to which a reference voltage "V blank" is applied. With the switch 128 in an "up" position shown, input signals at the terminal 122 are applied to the terminal 134 of the switch 128; with the switch 128 in a "down" position (not shown) the reference voltage "V blank" at the terminal 136 is applied to the terminal 134. Output signals from the MUX 124 are connected via a lead 140 from the terminal 134 through a resistor 142 to a negative (−) input terminal 144 of the amplifier 126. The amplifier 126 applies to an output lead 148 coupled thereto an output signal "V out" which is positive-going for a negative-going input at the terminal 144. Connected between the output lead 148 and the input terminal 144 of the amplifier 126 is a feedback resistor 150. The amplifier 126 has a positive (+) input terminal 152 which is connected to ground by a resistor 154. The resistors 142, 150 may be equal in resistance, and each twice that of the resistor 154. It is noted that the output lead 148 of the third section 54 here corresponds to a respective one of the leads 30, 31, 32 or the leads 40, 41, 42 (dashed lines) as shown in FIG. 1. The amplifier 126 has low output impedance.

The fourth section 56 of the ASP 14 serves as a feedback servo loop for setting to a desired output "zero" level the output image signals "V out" from the third section 54 regardless of the gain setting of the second section 52. As will be explained in greater detail shortly, the "zero" level of the output image signals from each third section 54 (e.g., the dark level of the respective color-component signals being processed by each one of the ASP's 14A, 14B and 14C of FIG. 1) should be the same regardless of the gain setting of each second section 52. The fourth section 56 comprises an operational amplifier (OAMP) 160, a switch 162, and a capacitor 164 and a buffer amplifier 165. The OAMP 160 has a negative (−) input terminal 166 which is connected via a lead 167 to the output lead 148 of the third section 54. The OAMP 160 has a positive (+) input terminal 168 to which is applied a reference voltage "V clamp 2". The difference in voltage between the image signals ("V out") applied to the terminal 166 and the reference voltage at terminal 168 is amplified and outputted in proper polarity by the OAMP 160 to a lead 170 which is connected to a first terminal of the switch 162. This switch 162 (shown open) is actuated by a control signal "φ clamp 2" as indicated by the dashed line 172. A second terminal of switch 162 is coupled via a lead 174 to a first terminal of the capacitor 164 and to the buffer amplifier 165. A second terminal of the capacitor 164 is coupled to ground. When the switch 162 is closed the voltage on the lead 170 is applied via the lead 174 across the capacitor 164 and ground. The buffer amplifier 165 is connected via a lead 176 to the terminal 114 which thus receives a voltage, termed "V offset", proportional to that stored across the capacitor 164. The capacitor 164, by way of example, has a capacitance of 2000 pF and is externally provided. The capacitor 164 is made large enough so that from one cycle of opening of the switch 162 to the next cycle of switch opening the voltage "V offset" remains substantially constant. The voltage "V offset" resulting from the servo action of the fourth (feedback) section 56 automatically maintains, at a set value referenced to the voltage "V clamp 2", the direct current "zero" or dark level of the image signals "V out" on the lead 148 regardless of the gain setting of the second section 52. It is of course understood that in the imaging system 10 (FIG. 1), the voltage "V clamp 2" is applied common (along with "V camp 1" and "V blank") to the ASP's 14A, 14B and 14C. Thus by placing the feedback (fourth) section after the variable gain amplifier (second) section in the ASP 14, white balancing of the color-components of the image signals does not interact with their "dark" level balance. The respective switches 68, 76, 78, 128 and 162 are readily implemented as JFET transistors or as diode bridges. The time-relations of the respective control signals "φ clamp 1", φ sample", "φ blank", "φ clamp 2", and image signals from the CCD unit 12 are described hereinafter. The novel architecture of each ASP 14 is such that the circuitry is readily implemented as a single integrated circuit using bipolar/JFET technology. Only two external elements, the capacitors 60 and 164, are required.

Figure 3:
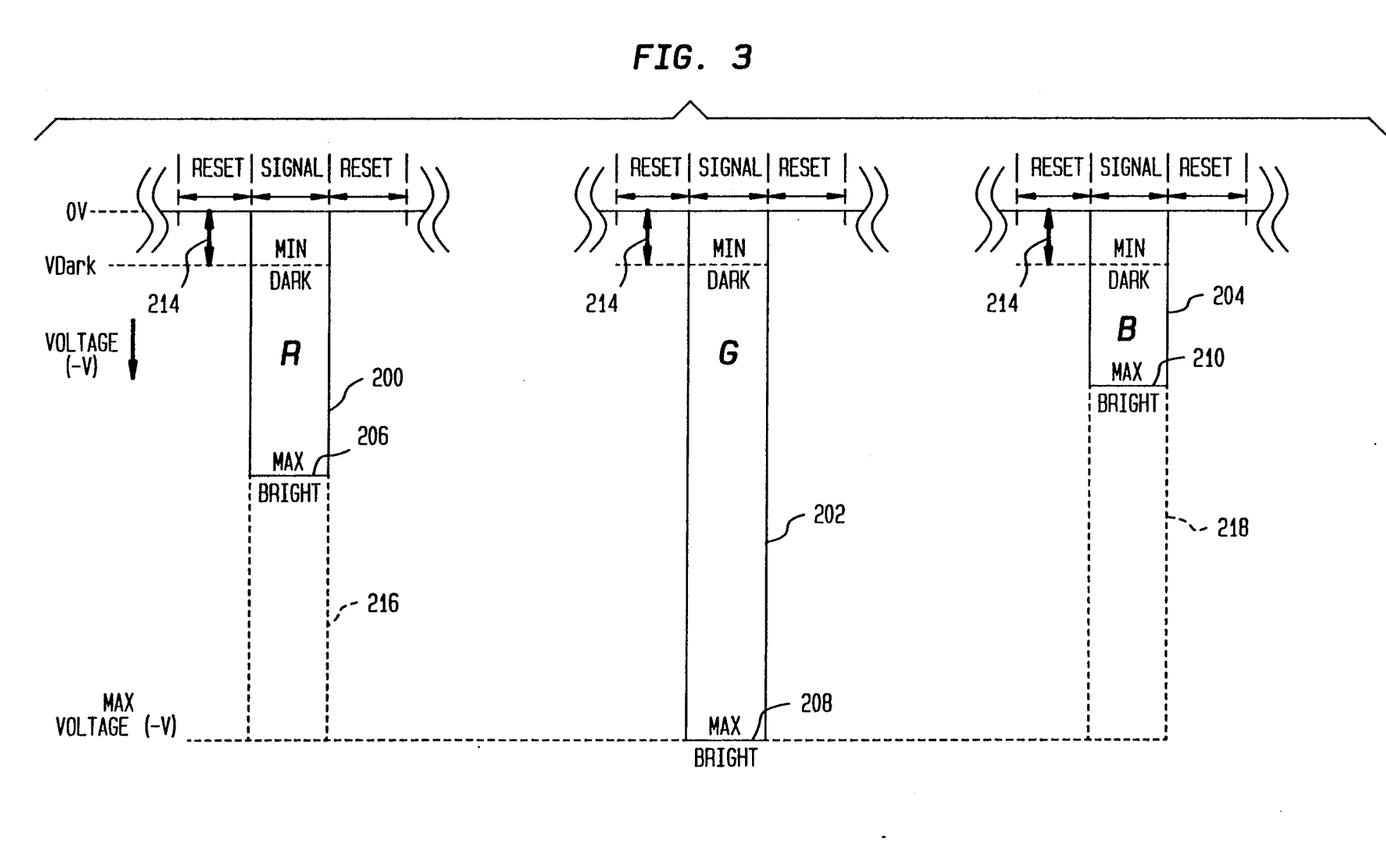
FIG. 3 is a schematic diagram showing by way of illustration voltage levels of respective R, G and B color components of image signals produced by a CCD imaging unit.

Referring now to FIG. 3, there is shown a schematic representation of the red (R), green (G) and blue (B) color-components 200, 202 and 204 of respective pixel image signals from an imaging unit, such as the CCD unit 12 of FIG. 1. These R, G and B component signals 200, 202 and 204 correspond for example, to the first, second, and third color-component signals of the imaging system 10 (FIG. 1). As illustrated here, the vertical axis indicates signal voltage increasing in the negative direction from a zero value (0 V) to a maximum negative voltage (−V). The horizontal axis (not to scale) shows the relative time duration of the "signal" and "reset" intervals of the respective R, G and B pixel signals.

During a "signal" interval each pixel signal from the CCD unit 12 is "sampled" and the resulting analog voltage processed through the ASP 14. Each "reset" interval between signal intervals permits the next image pixel to be shifted to the output of the CCD unit 12 and then sampled, as is well known in the art. The R pixel signal (for a given maximum brightness) is indicated at 200 by a solid-line rectangle, the G signal at 202, and the B signal at 204. Because of the differences in light transmittances for the color masks in the CCD unit 12 used to obtain the respective color-components of an image signal and because of the different magnitudes of the color components of incoming "white" light, the maximum bright amplitude indicated at 206 of the R signal 200 is substantially less that the maximum bright amplitude indicated at 208 of the G signal 202. Similarly, the maximum bright amplitude 210 of the B signal 204 is much less than for the G signal 202. By way of example, the R "max bright" amplitude 206 is shown as half the G max bright amplitude 208, and the B max bright amplitude 210 as one-third the G max bright amplitude 208.

As was explained previously, when no light reaches the CCD unit 12, there is in fact a minimum "dark" ("min dark") signal level produced by the respective cells (e.g., the cells 24) of the CCD unit 12. This minimum dark voltage "V dark" (below zero volts) is indicated by the respective arrows 214 for the R, G and B signals 200, 202 and 204. In order to avoid dark background variations in an image reproduced from the CCD unit 12, it is necessary to reference accurately to a "zero" or constant d.c. level the "V out" image signals from the ASP 14. This is accomplished by the fourth (feedback) section 56, as was previously described. But to obtain "white balance" of the R, G and B color components of the image signals as illustrated here, it is necessary to equalize the respective max bright levels of the R, G and B signals 200, 202 and 204 to correspond to their actual levels in the original "white" scene or image. White balance of the analog R, G, and B signals 200, 202, and 204 is easily obtained by adjusting the gains of the amplifiers 100 of the respective ASP's 14A, 14B, and 14C. Thus where analog output image signals are applied via the leads 40, 41, and 42 to the display 22 no further white balancing is required. On the other hand it is desirable, from the standpoint of minimizing quantizing errors in the A/D converter 18 of the system 10 (FIG. 1), for the respective analog R, G, and B image signals applied to it via the lead 34 to all have the same maximum amplitude. Thereafter white balance of the digitized R, G, and B signals is easily provided by the DSP 20. Thus by adjusting the gain of the amplifier (second) section 52 of the respective ASP 14 which processes the R signal 200, the max bright level 206 is increased to the maximum voltage ($-V$) corresponding to the max bright level 208 of the G signal 202. This increase in the max bright level of the R signal 200 is indicated by the dashed line portion 216 and represents, by way of example, an amplification in the second section 52 of twice the original R signal 200. Similarly, the B signal 204 is amplified by three times to increase its max bright level as indicated by the dashed line portion 218. This incremental amplification of the R and B signals 200 and 204 equalizes their max bright amplitudes with that of the G signal 202. But incremental amplification of the R and B signals would otherwise incrementally amplify their min dark level "V dark" by differing amounts. However, the servo action of the feedback (fourth) section 56 of each ASP 14 (e.g., 14A, 14B and 14C) nullifies such changes in the dark level. The fourth section 56 of each ASP 14 (FIG. 2), at suitable intervals determined by the timing of the control signal "$\phi$ clamp 2", references the d.c. level of the output image signals "V out" on the lead 148 to the voltage "V clamp 2". The voltage "V clamp 2" is chosen, as is known in the art, in accordance with the output level of "dark" pixels at the beginning of each horizontal row or line of pixels in the CCD unit 12, as will be explained shortly. The servo action of the fourth (feedback) section 56 is termed "line rate clamping". The voltage "V offset" at the terminal 114 is refreshed at the beginning of each line of pixels of the CCD unit 12. Thus low frequency and thermal variations in the dark level within the CCD 12 unit are removed from the d.c. output level of the image signals "V out" of the ASP 14. For increased accuracy the feedback (fourth) section 52 is made relatively slow in its response.

Figure 4:
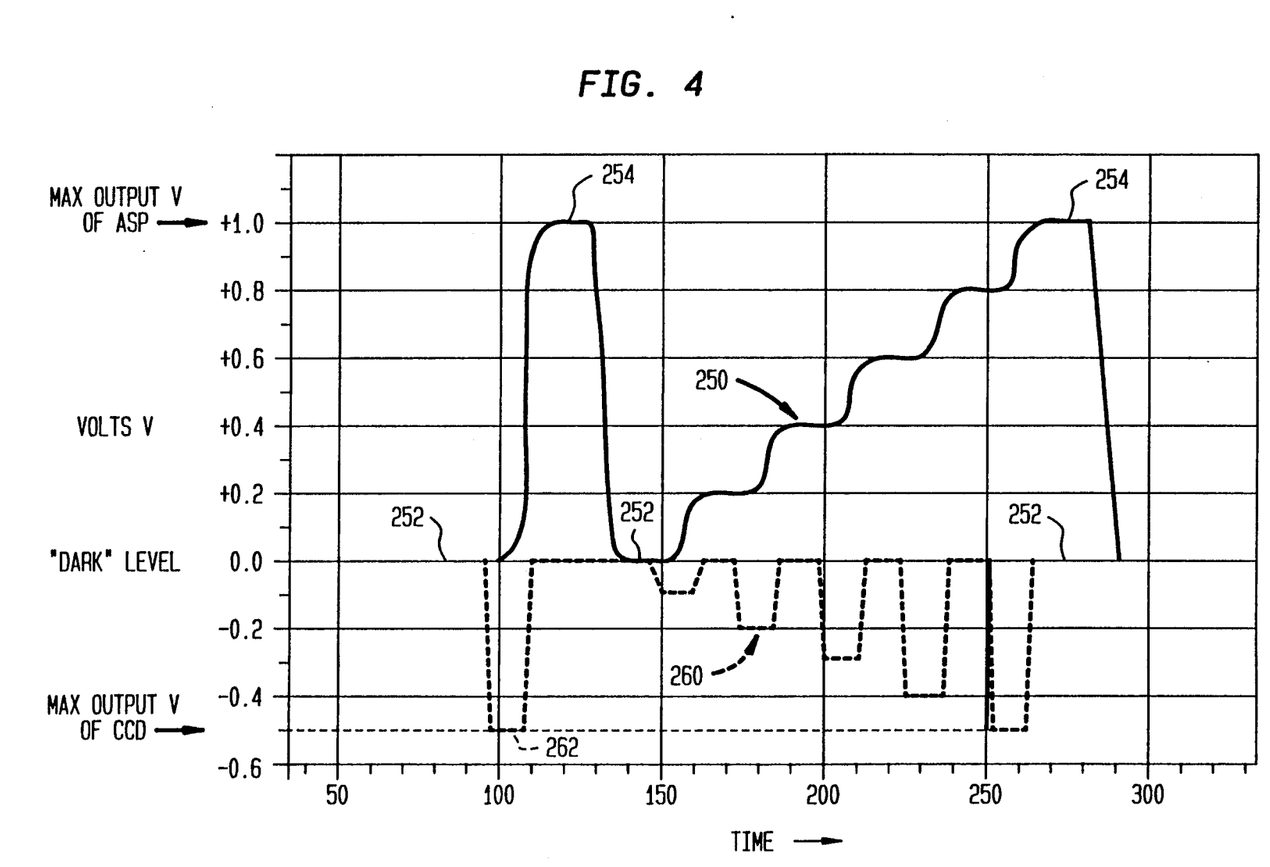
FIG. 4 is a graph of voltage versus time showing, by way of example, input image signals (dashed lines) to the ASP and output image signals (solid lines) from the ASP.

Referring now to FIG. 4, there is shown a graph of an output image signal waveform 250 produced by the ASP 14 and applied to the lead 148 as "V out". The vertical axis of the graph is in volts and the horizontal axis is in normalized units of time with an arbitrary zero. For a 40 MHz sample rate the time units here are in nanoseconds and the time interval from one pixel image signal to the next is 25 nanoseconds. The output image waveform 250 arbitrarily depicts a stair-step signal representing an image brightness scale increasing by increments from a "dark" level at 252 (0.0 volts) to a max bright level at 254 (+1.0 volt), and then repeating from dark to light. The corresponding pixel image signals from the CCD unit 12 as sampled by the ASP 14 are illustrated by the dashed line, negative-going "sampled" waveform 260. The "dark" level of the sampled waveform 260 is also at 252 (0.0 volts), and the max bright level "sampled" waveform 260 here represents the "green" pixel image signal 202 (FIG. 3). The "red" and "blue" signals 200 and 204 are then amplified accordingly in their respective ASP's 14. This brings the R and B max bright outputs up to the same signal output level 254 (+1.0 v) as G max bright, thus minimizing quantizing errors in the A/D converter 18, as was explained previously. The servo action of the fourth sections 56 of the ASP's 14 keeps the R, G and B dark levels zeroed at 252 (0.0 volts) regardless of the gain settings of the second sections 52 of the ASP's 14.

Figure 5:
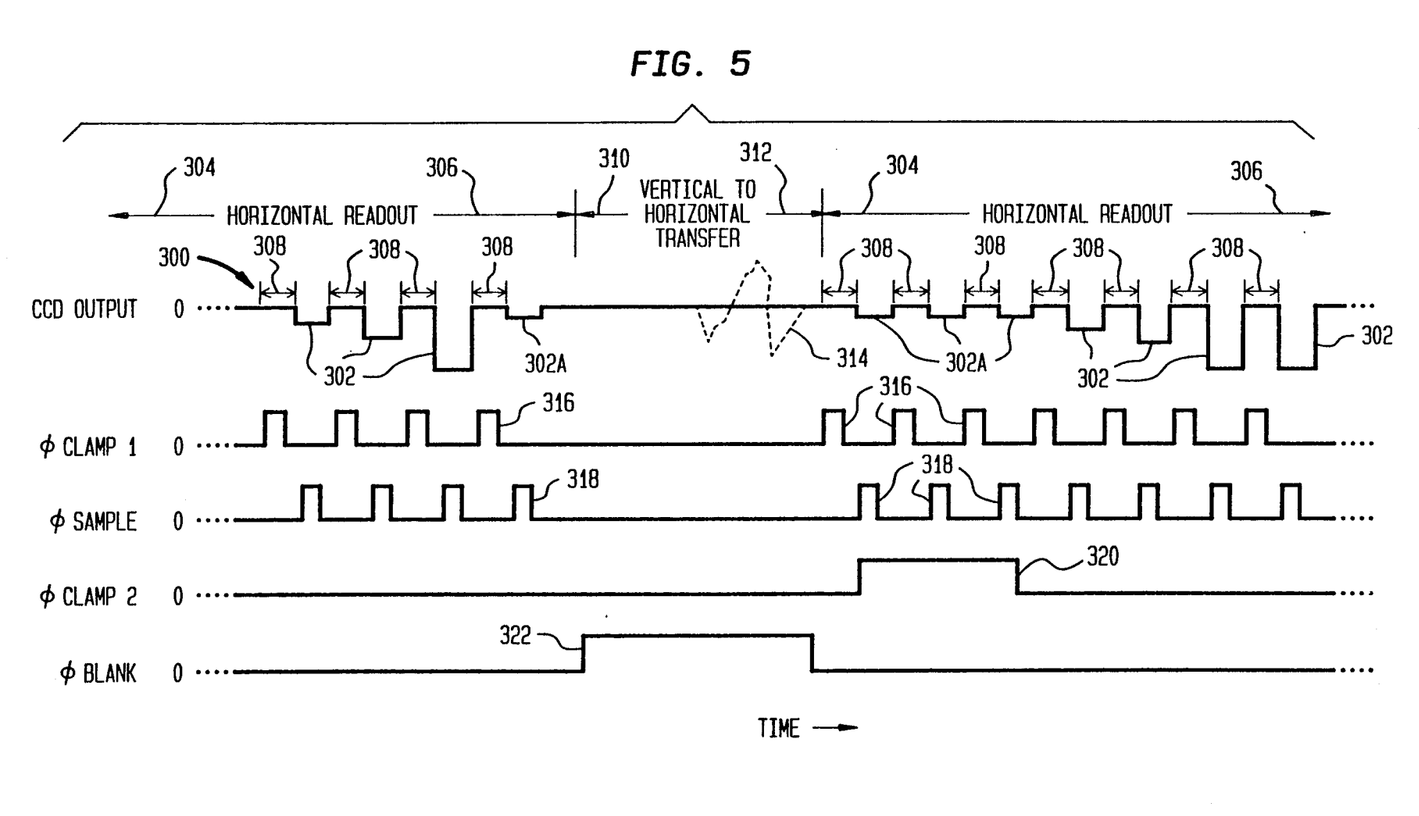
FIG. 5 is a timing diagram showing the time relationship between pixel image signals from a CCD unit and various control signals ($\phi$) used in conjunction with the ASP of FIG. 2.

Referring now to FIG. 5, there is shown a timing diagram (not to scale) illustrating the relative times and durations of "CCD output" signals and the respective control signals "$\phi$ clamp 1", "$\phi$ sample", "$\phi$ clamp 2", and "$\phi$ blank". Time is indicated along the horizontal axis and relative voltage for the various signals (above or below a "0" value for each signal) along the vertical axis. The CCD output is indicated at 300 and is shown as a series of negative-going signal pulses 302 (arbitrarily increasing in stair-step fashion) during an extended horizontal time readout, as indicated by the arrows 304 and 306, of a line of pixels of the CCD unit 12. By way of example at the end of horizontal readout there occurs in the CCD output 300 a "dark" level (no light) signal pulse indicated at 302A. Three of these dark level pulses 302A also occur at the beginning of the next horizontal readout. The short reset intervals between the pulses 302 and 302a are as indicated by the double ended arrows 308. The duration of the signals 302 and 302A and the reset intervals 308 are shown as approximately equal and correspond to the "signal" and "reset" intervals previously illustrated in FIG. 3. At the end of each interval of horizontal readout there is an interval, termed "vertical to horizontal transfer" and indicated by the arrows 310 and 312, during which a next line of image pixels within the CCD unit 12 is shifted into position for another horizontal readout, and so on. During vertical to horizontal transfer, unwanted switching transients indicated by a dotted line waveform 314, may be present but are "blanked" out of the output image signals "V out" produced by the ASP 14, as will be explained shortly.

The control signals "$\phi$ clamp 1" comprise a series of short duration pulses 316 each of which is approximately centered within a reset interval 308 of the CCD output 300. Each "$\phi$ clamp 1" pulse 316 closes the switch 68 within the first section 50 (FIG. 2) of the ASP 14 for a short time during which the reference voltage "V clamp 1" is applied to the capacitor 60. The "$\phi$ sample" control signals are a series of short duration pulses 318, each of which is approximately centered within the interval of a respective signal pulse 302 and 302A of the CCD output 300. It is noted that the "$\phi$ sample" pulses 318 occur between the "$\phi$ clamp 1" pulses 316. Thus the switches 76 and 78 are closed when the switch 68 is open, and are open when the switch 68 is closed.

The "$\phi$ clamp 2" control signal is a pulse 320 which occurs shortly after the end of the vertical to horizontal transfer interval. The "$\phi$ clamp 2" pulse 320 begins after the end of a "$\phi$ blank" control signal pulse 322 which controls the switch 128. When the "$\phi$ clamp 2" pulse 320 is present (i.e., during the three "$\phi$ sample" pulses 318 indicated) the switch 162 in the fourth (feedback) section 56 is closed. This permits the capacitor 164 to be fully charged to a voltage (proportional to "V offset") determined by servo action of the fourth section 56 from the sampled values of three dark level signals 302A referenced to "V clamp 2". The "φ blank" pulse 322 begins just after the vertical to horizontal transfer interval begins and ends shortly before this interval ends. When the pulse 322 is present the switch 128 in the MUX 124 moves down to the contact 132 and inserts the reference voltage "V blank" into the output signal "V out" on the lead 148. The reference voltage "V blank" applied to the terminal 136 of the MUX 124 can be adjusted to insert during the duration of the "φ blank" signal pulse 322, a zero volt level within the vertical to horizontal transfer interval, as indicated here. Alternatively, the voltage "V blank" can be adjusted to insert a "step" voltage level different from the zero one shown here. Circuits for generating the respective control signals (φ) are well known in the art. The respective reference voltages are temperature compensated (along with supply voltages not shown) so that the operation of the ASP 14 is stable over a range of temperatures.

Figure 6:
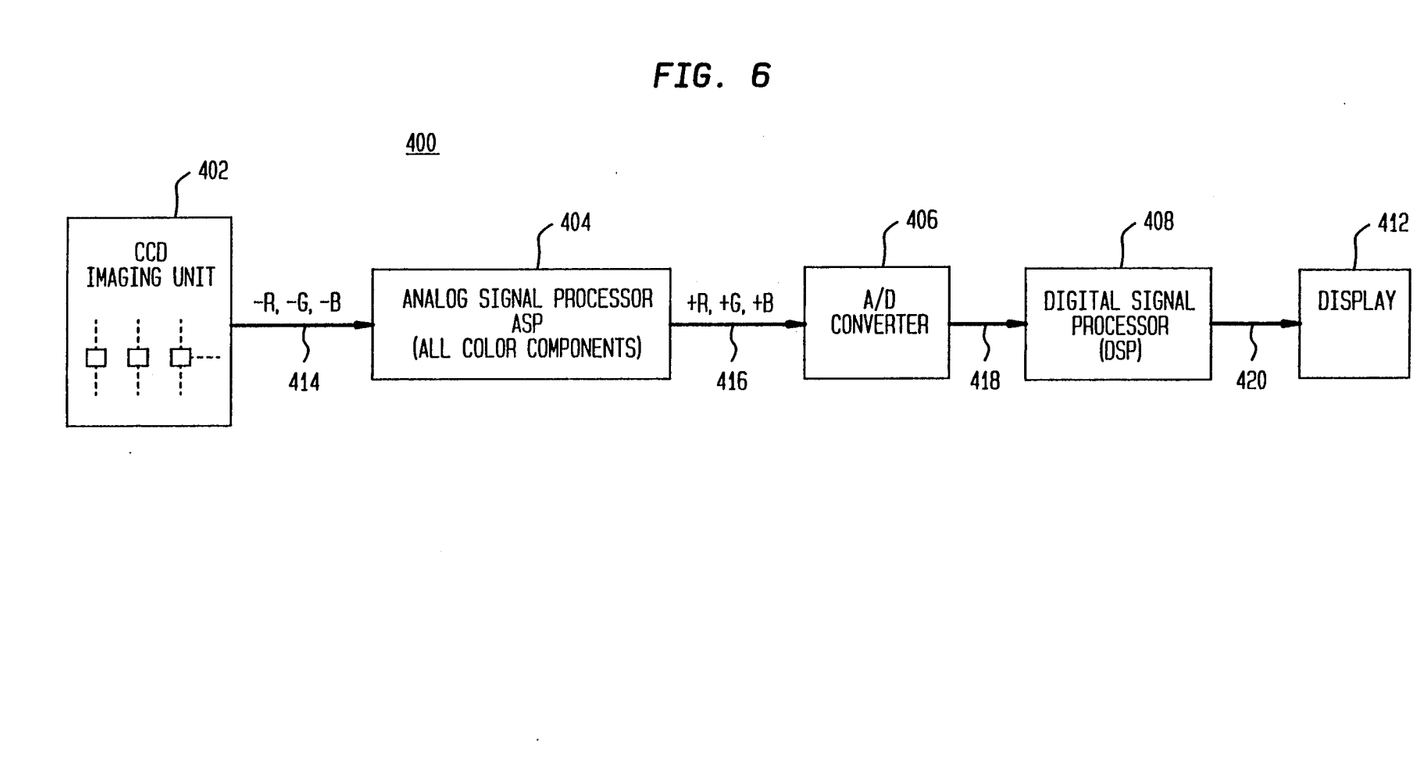
FIG. 6 is a schematic block diagram of another color imaging system also in accordance with the present invention.

Referring now to FIG. 6, there is shown an electronic color imaging system 400 in accordance with the present invention. The system 400, as will be appreciated from the following description, is able to provide photographic-quality color images and is highly efficient and economical in its circuit architecture. The system 400 comprises a CCD imaging unit 402, a single analog signal processor (ASP) 404, an analog to digital (A/D) converter 406, a digital signal processor (DSP) 408, and a display 410. The CCD unit 402 (which is typically of a type well known in the art) outputs in serial form color-component pixel image signals shown here, by way of example, as −R, −G, and −B. These pixel image signals are applied, via a lead 414, to an input of the ASP 404 (to be described shortly) which processes the −R, −G and −B signals in sequence and outputs them as +R, +G, and +B color-component output image signals having uniform dark zero levels and equal amplitudes. The R, G, and B output image signals are applied via a lead 416 directly to the A/D converter 406 where they are digitized and then applied via a lead 418 to the DSP 408. The DSP 408 "white balances" the R, G, and B component digital signals and applies them via a lead 420 to the display 410 where they can be viewed as photographic-quality full color images. The A/D converter 406, the DSP 408, and the display 410 are known in the art.

Figure 7:
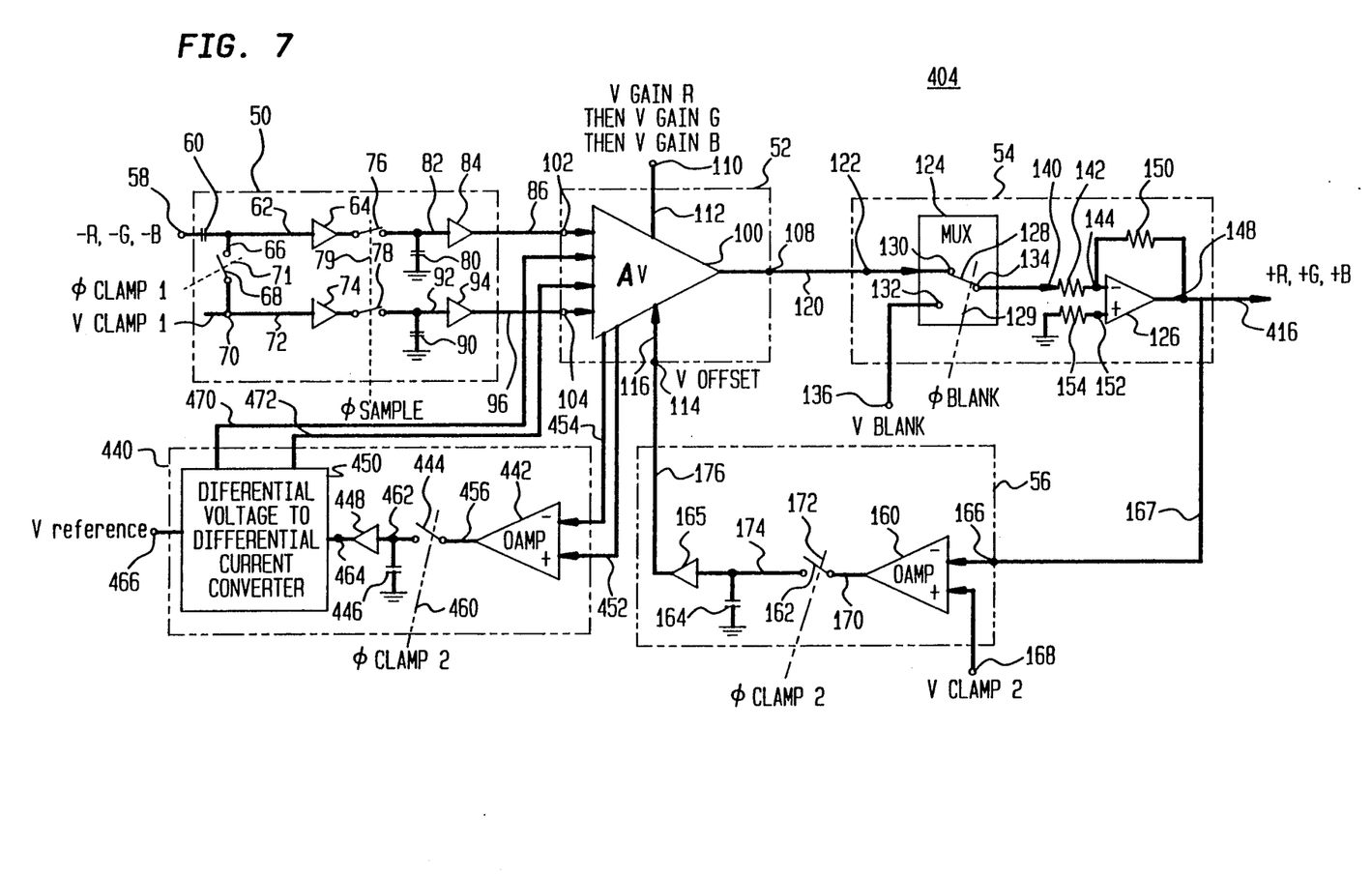
FIG. 7 is an illustrative schematic circuit of the single analog signal processor (ASP) in the imaging system of FIG. 6 and is also in accordance with the present invention.

Referring now to FIG. 7, there is shown a circuit diagram of the ASP 404 of FIG. 6. Certain elements of the ASP 404 are identical to corresponding elements of the ASP 14 (FIG. 2). For ease in understanding the circuit and operation of the ASP 404, elements corresponding to those of the ASP 14 are here given the same reference numbers and their description will not be repeated in detail. Briefly stated, the ASP 404 comprises a first (input) section 50, a second (amplifier) section 52, a third (output) section 54, a fourth (feedback) section 56, and a fifth (feedback) section 440. The first section 50 of the ASP 404 receives at its input terminal 58 the −R, −G, −B pixel image signals in serial form from the CCD unit 402 (FIG. 6). These sequential signals are respectively clamped, sampled and held in the way previously described in connection with the ASP 14 (FIG. 2). Differential signals from the section 50 are applied to the terminals 102 and 104 of the amplifier section 52 where the respective R, G and B color-component signals are individually amplified (not by the same amounts) and dark level variations eliminated, as was previously described. It is to be noted that a gain control terminal 110 of the amplifier section 52 of the ASP 404 has applied to it (from a control unit not shown) in sequence, separate gain control signals "V gain R", "V gain G", and "V gain B" which, as will be described shortly, are synchronized with the respective R, G, and B color-component image signals being processed by the amplifier section 52 of the ASP 404. In this way there is determined at each instant the appropriate amount of gain for an "R" signal, for a "G" signal, and for a "B" signal as it passes through the amplifier section 52 of the ASP 404 in order to equalize their respective maximum amplitudes (see FIG. 3). The section 52 applies its amplified R, G, and B signals to the third section 54 which operates as previously described. The section 54 of the ASP 404 applies via its output lead 148 maximum amplitude +R, +G, and +B signals to the lead 416 and the A/D converter 406 (FIG. 6).

The fourth (feedback) section 56 provides a servo loop to minimize dark level variation in the output image signals. This operates as previously described. However, in the ASP 404, where the gain of the amplifier (second) section 52 is being changed "on-the-fly" by the sequential control signals "V gain R", "V gain G", and "V gain B", additional feedback means are provided in order to eliminate dark level variation caused by the changes in the gain of the amplifier section 52. The fifth (feedback) section 440 is provided for this purpose. The fifth section 440 comprises an operational amplifier (OAMP) 442, a switch 444, a storage capacitor 446, a buffer amplifier 448 and a "differential voltage to differential current" converter 450 (well known in the art). The OAMP 442 has positive and negative inputs which are connected via a lead 452 and a lead 454 to suitable nodes (not shown) within the "Av" amplifier 100. By way of example, these nodes may correspond to the collectors of the transistors Q29 and Q30 of the circuit shown in FIG. 10 of the above-identified Blauschild article. The OAMP 442 is connected by a lead 456 to a first terminal of the switch 444. This switch is actuated by the "φ clamp 2" control signal (see FIG. 5), as indicated by a dashed line 460. A second terminal of the switch 444 is connected via a lead 462 to a first terminal of the capacitor 446 and to the input of the buffer amplifier 448. A second terminal of the capacitor 446 is grounded. By way of example, the capacitor 446 has a capacity of 2000 pF and is externally provided. The output of the buffer amplifier 448 is connected to an input terminal 464 of the converter 450. Another input terminal 466 of the converter 450 is connected to a reference voltage "V reference". By way of example, this voltage may be the same as "V clamp 2". The converter 450 has outputs which are connected via two output leads 470 and 472 to nodes (not shown) within the "Av" amplifier 100. By way of example, the lead 470 may be connected to the collector of the transistor Q1, and the lead 472 connected to the collector of the transistor Q2 as shown in FIGS. 4 and 10 of the above-identified Blauschild article. The leads 470 and 472, through the servo action of the fifth (feedback) section 440, apply differential currents (i.e., correction signals) which effectively drive to zero the differences in differential currents within the amplifier 100 representing "dark" level pixel image signals (e.g., the pulses 302A in FIG. 5). By way of example, the correction signals applied by the leads 470 and 472 to the amplifier 100 drive differences between signal currents (such as currents $I_A$ and $I_B$ in FIG. 4 of Blauschild) effectively to zero. Thereafter, subsequent amplification of a "zero" difference between dark level signal currents gives a "zero" dark signal out regardless of the gain setting of the "Av" amplifier 100. In other words, "zero" multiplied by any factor is still "zero". Thus the gain of the amplifier 100 may be changed in time by the sequence of R, G, B gain control signals "V gain R", "V gain G", and "V gain B" applied to the terminal 110 without affecting the dark zero level of the respective R, G, B output image signals. The R, G, and B gain control signals applied to the terminal 110 are synchronized with the respective "φ sample" control signals which sequentially sample the incoming $-R$, $-G$, and $-B$ pixel image signals applied to the terminal 58 of the ASP 404. The fourth (feedback) section 56 of the ASP 404 additionally eliminates variations in the dark zero level which may be caused by errors, thermal drift, etc. downstream of the fifth (feedback) section 440. In certain instances where the highest quality of image reproduction is not necessary, the fourth section 56 may be omitted from the ASP 404. It will now be appreciated that the single ASP 404 with great economy and efficiency provides R, G, B color-component output image signals which are combined to produce photographic-quality electronic color images. By way of example, the sequential R, G, and B pixel image signals may be processed in the ASP 404 at a 10 MHz rate.

It is to be understood that the imaging systems 10 and 400 and the ASP's 14 and 404 described herein are illustrative of the general principles of the invention. Modifications may readily be devised by those skilled in the art without departing from the spirit and scope of the invention. For example, the imaging systems are not limited to a particular CCD imaging unit, or to three color components, or to the R, G and B colors described. Moreover, an ASP is not limited to a particular feedback loop, or to the amplifier gain values illustrated, or to a particular input signal sampling rate, or to the voltage levels mentioned. An ASP is not restricted to implementation as an IC, or to manufacture as an IC by a particular process technology.

What is claimed is:

1. An analog signal processor (ASP) for use with a CCD imaging unit in an electronic image system, the ASP comprising:
   an input section having means for receiving input image pixel signals from the CCD unit and for clamping, sampling and holding sample values of the pixel signals for processing within the ASP;
   amplifier means for receiving the sample values of the pixel signals and for amplifying the signals with a selected gain at low noise over a wide bandwidth to obtain output image signals, the amplifier means having gain which is adjustable over a range and having a feedback signal input for setting a d.c. level of the output image signals at a desired dark zero value;
   feedback means for sensing output image signals from the ASP and for feeding back to the feedback signal input of the amplifier means correction signals for setting the dark zero value of the output image signals independent of the gain setting of the amplifier means; and
   wherein the input section includes a series coupling capacitor having a first terminal which is connected to receive pixel signals from the CCD unit, a clamping switch to momentarily connect a second terminal of the coupling capacitor to a voltage terminal at which a first reference voltage is applied;
   first and second storage capacitors;
   first and second sample switches which are operated together, the first sample switch being connected to apply a momentary sample of the pixel signals received from the second terminal of the coupling capacitor across the first storage capacitor, and the second sample switch being connected to momentarily apply the first reference voltage at the voltage terminal across the second storage capacitor; and
   circuit means for applying the respective voltages on the first and second storage capacitors to the amplifier means, the clamping switch being adapted to momentarily close when the first and second sample switches are open, and to open when the first and second sample switches are closed.

2. The ASP of claim 1 wherein the first and second storage capacitors are in the picofarads range and are essentially equal in capacitance.

3. The ASP of claim 1 wherein the feedback means being adapted to receive a second reference voltage which by servo action of the feedback means determines the dark zero value of the output image signals independent of the gain setting of the amplifier means.

4. The ASP of claim 3 in further combination with:
   a substantially identical ASP; and
   the first ASP being connected to receive a first color-component image signal from the CCD unit, the second ASP being connected to receive a second color-component image signal from the CCD unit, the respective gains of the ASP's being adjusted to equalize the levels of the respective output image signals from the ASP's, the first and second reference voltages being applied in common to the ASP's.

5. An analog signal processor (ASP) comprising:
   a first section for receiving pixel image signals from a CCD unit, the first section having circuit means for correlated double sampling of the pixel image signals, and for differentially sampling and holding values of the pixel signals and of a first reference voltage as respective stored analog voltages;
   a second section for receiving the stored analog voltages, the second section having amplifier means for differentially combining the stored analog voltages and for providing an output signal, the second section having an adjustable gain control and having a feedback signal input for adjusting a d.c. zero dark level of the output signal;
   a third section for receiving an output signal from the second section and for providing an output signal at low impedance;
   a fourth section being adapted to receive an output signal and to apply a compensating signal to the feedback signal input of the second section;
   the fourth section having feedback means for referencing the zero level of the output signal against a second reference voltage and for adjusting the compensating signal by servo action to maintain a desired balance between the second reference voltage and the zero dark level such that the pixel image signals can be accurately sampled over a wide range of sample rates, the gain of the second section is adjustable and the zero dark level of the output signal is determined independently of the gain; and the four sections of the ASP being adapted to be implemented as a single integrated circuit.

6. The ASP of claim 5 wherein the first section comprises:

a series coupling capacitor having a first terminal which is connected to receive pixel signals from the CCD unit;

a clamping switch to momentarily connect a second terminal of the coupling capacitor to a voltage terminal at which the first reference voltage is applied;

first and second storage capacitors;

first and second sample switches being operated together, the first sample switch being connected to apply a momentary sample of the pixel signals received from the second terminal of the coupling capacitor across the first storage capacitor, and the second sample switch being connected to momentarily apply the first reference voltage at the voltage terminal across the second storage capacitor, and circuit means for applying the respective analog voltages stored on the first and second storage capacitors to the second section;

the clamping switch being adapted to momentarily close when the first and second sample switches are open and to open when the first and second sample switches are closed; and the first and second storage capacitors are of suitable capacitance to operate at sample rates used with ASP and are closely matched to each other such that a dynamic range of better than 8-bits is obtained at high sample rates and better than 10-bits at a slow sample rate.

7. The ASP of claim 5 wherein the second section comprises a differential voltage to differential current input stage, a Gilbert gain cell, and a differential current to single-ended voltage output driver.

8. The ASP of claim 5 wherein the third section comprises:

a multiplex unit and an inverter amplifier, the multiplex unit having a first input terminal for receiving the output signals from the second section, and having a second terminal to which is applied a third reference voltage;

the multiplex unit being adapted to apply output signals to the inverter amplifier during horizontal readout of the pixel signals from the CCD unit, and to apply the third reference voltage to the inverter amplifier during the vertical to horizontal line transfer in the CCD unit; and the inverter amplifier being adapted to provide an output signal the polarity of which is opposite to the polarity of the pixel image signals from the high impedance CCD unit.

9. The ASP of claim 5 wherein the fourth section comprises:

an operational amplifier having an output;

a storage capacitor and a switch connected between the output and the storage capacitor;

the operational amplifier having a first input connected to receive an output signal from the third section, and having a second input connected to the second reference voltage; and the compensating signal being stored across the storage capacitor and being periodically refreshed by the momentary closing of the switch.

10. The ASP of claim 5 in further combination with a plurality of like ASP's, each ASP being connected to receive a respective color-component image signal from the CCD unit, the gain of each ASP being set so that the maximum bright amplitude of each color-component output signal is equalized for white balance, the respective ASP's each being supplied with the first and second reference voltages and being operated in unison.

11. An analog signal processor (ASP) comprising:

first, second, third, and fourth sections;

the first section comprises:

a series coupling capacitor one terminal thereof which is connected to receive pixel signals from the CCD unit;

a clamping switch adapted to momentarily connect the other side of the coupling capacitor to a voltage terminal at which a first reference voltage is applied;

first and second storage capacitors;

first and second sample switches being operated together, the first sample switch being connected to apply a momentary sample of the pixel signals received from a second terminal of the coupling capacitor across the first storage capacitor, and the second sample switch being connected to momentarily apply the first reference voltage at the voltage terminal across the second storage capacitor; and circuit means for applying the respective analog voltages stored on the first and second storage capacitors to the second section, the clamping switch being adapted to momentarily close when the first and second sample switches are open, and to open when the first and second sample switches are closed; and the first and second storage capacitors being essentially of the same capacitance;

the second section comprises a differential voltage to differential current input stage, a Gilbert gain cell, and a differential current to single-ended voltage output driver;

the third section comprises a multiplex unit and an inverter amplifier, the multiplex unit having a first input terminal for receiving the output signals from the second section, and having a second terminal to which is applied a second reference voltage;

the multiplex unit being adapted to apply output signals thereof to the inverter amplifier during horizontal readout of the pixel signals from the CCD unit, and to apply the second reference voltage to the inverter amplifier during the vertical to horizontal line transfer in the CCD unit;

The inverter amplifier being adapted to provide an output signal, the polarity of which is opposite to the polarity of the pixel image signals from the CCD unit;

the fourth section comprises a feedback loop with an amplifier having an output, a storage capacitor and a switch connected between the output and the storage capacitor, and an input for a third reference voltage; and the amplifier having an input connected to receive an image signal whose dark level is to be set at a desired zero level, and the amplifier being adapted to generate at an output thereof a compensating voltage which is stored in the storage capacitor and is periodically refreshed by the momentary closing of the switch, the compensating voltage being applied to the second section to reference the dark zero level of the output signals to the third reference voltage.

12. An electronic color image system in which a photo-imaging unit provides a plurality of color-component pixel image signals, the electronic color image system comprising:

a plurality of analog signal processors (ASP's) which are substantially identical and which are operated in unison, each ASP being connected to receive a respective one of the color-component pixel image signals and for providing an amplified color-component output image signal to be combined into a full color image with white balance and uniform dark background level;

each ASP comprises:

a first section for receiving the pixel image signals from the imaging unit, the first section comprising circuit means for correlated double sampling of the pixel image signals, and for differentially sampling and holding values of the pixel signals and of a first reference voltage as respective stored analog voltages;

a second section for receiving the stored analog voltages, the second section comprises amplifier means for differentially combining the stored analog voltages and for providing an output signal, the second section having an adjustable gain control and having a control signal input for adjusting a d.c. zero dark level of the output signal; and a third section for receiving an output signal and for applying an offset signal to the control signal output of the second section, the third section having feedback means for referencing the zero level of the output signal against a second reference voltage and for adjusting the offset signal by servo action to maintain a desired balance between the second reference voltage and the zero dark level such that the pixel image signals can be accurately sampled over a wide range of sample rates, the gain of the second section being adjustable and the zero dark level of the output signal being determined independently of the gain.

13. An electronic color image system in which a photo-imaging unit provides a plurality of color-component pixel image signals, the electronic color image system comprising:

a plurality of analog signal processors (ASP's) which are substantially identical and which are operated in unison, each ASP being connected to receive a respective one of the color-component pixel image signals and for providing an amplified color-component output image signal to be combined into a full color image with white balance and uniform dark background level;

each ASP comprises:

a first section for receiving the pixel image signals from the imaging unit, the first section comprises switched circuit means for correlated double sampling of the pixel image signals, and switched sample means for differentially sampling and holding values of the pixel signals and of a first reference voltage as respective stored analog voltages, the switched circuit means being controlled by first control signals, the switched sample means being controlled by second control signals;

a second section for receiving the stored analog voltages, the second section having amplifier means for differentially combining the stored analog voltages from the first section and for providing an output signal, and the second section having an adjustable gain control and having a feedback signal input for adjusting a d.c. zero dark level of the output signal;

a third section having a multiplex unit and an inverter amplifier, the multiplex unit having a first input terminal for receiving the output signals from the second section, and having a second terminal to which is applied a second reference voltage;

the multiplex unit being adapted to apply the output signals thereof to the inverter amplifier during horizontal readout of the pixel signals from the CCD unit, and to apply the second reference voltage to the inverter amplifier during the vertical to horizontal line transfer in the CCD unit;

the inverter amplifier being adapted to provide an output signal the polarity of which is opposite to the polarity of the pixel image signals from the CCD unit; and a fourth section for receiving an output signal from the third section and for applying an offset voltage to the feedback signal input of the second section, the fourth section having switched feedback means for referencing the zero level of the output signal against a third reference voltage and for adjusting the offset voltage by servo action to maintain a desired balance between the second reference voltage and the zero dark level;

the switched feedback means being controlled by third control signals; and each ASP having applied to it the first, second, and third control signals, such that the pixel image signals can be accurately sampled over a wide range of sample rates, the gain of the second section is adjustable and the zero dark level of the low impedance output signals is determined independently of the gain.

* * * * *